US008671282B2

(12) United States Patent
Greene et al.

(10) Patent No.: US 8,671,282 B2
(45) Date of Patent: Mar. 11, 2014

(54) DIGITAL DATA AUTHENTICATION AND SECURITY SYSTEM (75) Inventors: Paul L. Greene, Leesburg, VA (US); Charles M. Tellechea, Jr., Leesburg, VA (US)

(73) Assignee: Mach 1 Development, Inc., Leesburg, VA (US)

( * ) Notice: Subject to any disclaimer, the term of this patent is extended or adjusted under 35 U.S.C. 154(b) by 0 days.

(21) Appl. No.: 13/429,350

(22) Filed: Mar. 24, 2012

(65) Prior Publication Data

US 2013/0254549 A1  Sep. 26, 2013

(51) Int. Cl.
*G06F 21/00* (2013.01)
(52) U.S. Cl.
USPC .......................................... 713/189; 713/165
(58) Field of Classification Search
USPC ................................. 713/189, 165
See application file for complete search history.

(56) References Cited

U.S. PATENT DOCUMENTS

| | | | | |
|---|---|---|---|---|
| 7,310,822 | B2 * | 12/2007 | LaMacchia et al. | 726/27 |
| 2004/0250122 | A1 * | 12/2004 | Newton | 713/201 |
| 2005/0043548 | A1 * | 2/2005 | Cates | 549/12 |
| 2007/0162747 | A1 * | 7/2007 | Lin et al. | 713/165 |
| 2008/0189676 | A1 * | 8/2008 | Satoh et al. | 717/104 |
| 2008/0229374 | A1 * | 9/2008 | Mick et al. | 725/93 |
| 2009/0292930 | A1 * | 11/2009 | Marano et al. | 713/189 |
| 2010/0171615 | A1 * | 7/2010 | Rhodes et al. | 340/551 |
| 2011/0023108 | A1 * | 1/2011 | Geldermann et al. | 726/13 |
| 2012/0011563 | A1 * | 1/2012 | Newton | 726/1 |
| 2012/0201382 | A1 * | 8/2012 | Thomasson et al. | 380/255 |

* cited by examiner

*Primary Examiner* — Matthew Smithers
(74) *Attorney, Agent, or Firm* — Da Vinci's Notebook, LLC

(57) ABSTRACT

The present invention includes a system and process for monitoring the transmission of secured, marked digital files. A cryptographic token inertly embedded in markup language tags of digital files is sought at a transmission gateway.

23 Claims, 11 Drawing Sheets

DIGITAL DATA AUTHENTICATION AND SECURITY SYSTEM

FIELD OF THE INVENTION

The present invention relates to the field of data security and more specifically to the field of data tracking and derivation analysis.

BACKGROUND

Extensible Markup Language "XML" is a flexible way to generate common, easily-exchanged information formats and share both the format and the data on the World Wide Web, internal networks, and elsewhere. XML is similar to hypertext markup language (HTML). Both XML and HTML include markup tags to describe a file or page's contents. HTML describes the content in terms of how the content is displayed while XML structures, stores, and transports information. Thus, an XML file can be processed purely as data by a program. Alternately, the XML file can be displayed or stored.

While HTML uses predefined tags, XML permits a developer of an XML document or fragment to define tags. Almost any data item can be identified using a XML tag. The standard method to allow an XML document to be created, accessed, or modified is with a document object model (DOM). A standardized specification has been developed that defines the interfaces for the different objects comprising the DOM, but does not provide any specifics for how a DOM should be implemented. Therefore, a programming language that utilizes a DOM compliant with the standard will produce an instance of that DOM that is language-neutral and platform-independent, regardless of how the underlying language implements the model.

Therefore, there is a need for a security process and system capable of discreetly marking files, marking files with authenticity data, efficiently searching for instances of the marked files internally and externally, and determining file alterations/modifications/actions.

SUMMARY

The present invention is directed to a steganographic digital data security process and system for authenticating files composed of markup language. The digital data security process includes accessing a markup language document object model that includes markup language format schema related to a particular digital file desired to be utilized by the present invention. Authenticity data is generated in the form of a cryptographic token with an identity marker. The digital file is reviewed to determine the markup language tag arrangement of which the digital file is constituted. The cryptographic token is placed within at least one of the markup language tags in a manner that prevents the cryptographic token from being recognized as markup language instructions according to the document object model. The resulting marked digital file carries within its markup language tags authenticity data relating to such information as is desired by a user to be associated with the digital file.

The marked digital file, because the interior authenticity data that identifies it is inert within the markup language tag(s), behaves exactly as an unaltered digital file. The marked digital file may undergo all of the processes of a similar digital file. The marked digital file will carry within its contents the identity marker and encrypted authenticity data; thus, a user may scour a suspect digital file or suspect set of digital files to find the marked digital file, which may be located or identified on the basis of the identity marker. When the identity marker is located within the marked digital file it may be culled from a larger file set for further review. A user may scour digital files and digital file sets in multiple fashions, transmission scouring, dynamic external scouring, dynamic internal scouring, or manual scouring. Upon identifying a file as pertaining to a desired source, a user may provide a key that decrypts the marked file to expose in plain text the authenticity data within the cryptographic identity token.

The digital data security system includes the markup language document object model, a cryptographic token generator, a markup language mapping function, a cryptographic token embedding function, a scouring agent, a persistent data storage facility, and a data retriever. The markup language document object model includes a listing of schema corresponding to one or more file formats. The cryptographic token generator is supplied with authenticity data including identity attribution elements to produce a cryptographic token with an identity marker that points to the containing encrypted authenticity data. The markup language mapping function reviews a digital file to determine the markup language tag arrangement of the file. The cryptographic token embedding function positions the cryptographic token inertly within a markup language tag that corresponds to sets of text, corresponding to grammatical or other stylistic text arrangements, and is purposefully imitative of markup language recognized as functional by the document object model corresponding to the digital file. The resulting output is a marked digital file.

The marked digital file of the present invention includes at least one cryptographic token of the present invention embedded inertly within the markup language of the contents of a digital file. The marked digital file may be created by the process of the present invention directly or indirectly. The system and process of the present invention are means of directly creating a marked digital file. A marked digital file may be indirectly created when a user copies a textual portion of a marked digital file. As a copier of the marked digital file may not copy a rendered subcomponent of the marked digital file without also copying the markup language related to the copied portion, a new document derived from the marked digital file also includes the authenticity data of the original marked digital file. The present invention permits tracking of a document derived from marked digital files as well marked digital files.

The system and process further include scouring markup language tags within a file for an identity marker; scouring a database of multiple external files composed of extensible markup language for an identity marker; scouring a transmission of multiple files composed of extensible markup language for an identity marker; and scouring a database of multiple internal files composed of extensible markup language for internal files lacking an identity marker. The present invention further includes a file created according to the process and subprocesses herein or utilized by the system and components thereof. Instructions may be provided to systems and software manipulating an editable document with a cryptographic token with particular authenticity data.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

DETAILED DESCRIPTION

Figure 1:
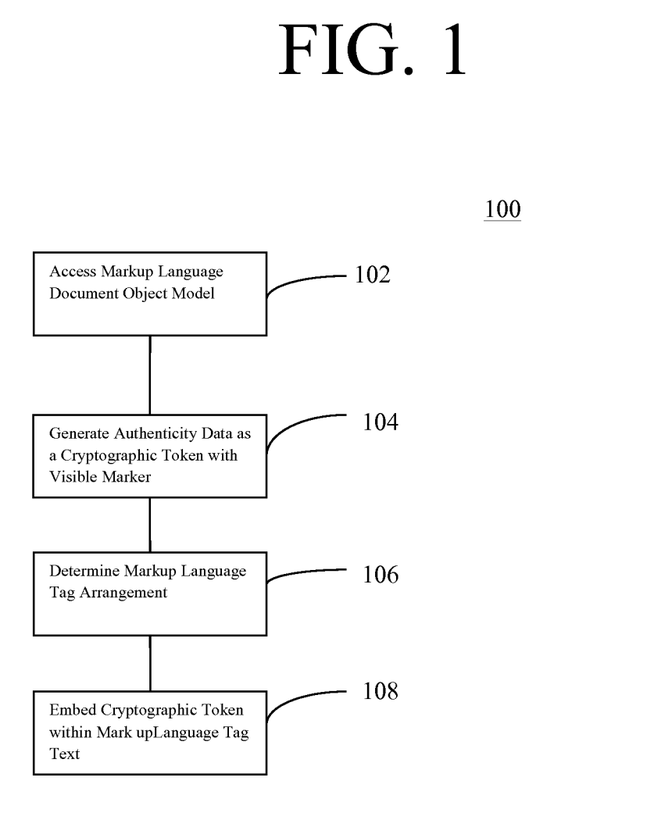
FIG. 1 is a view of an embodiment of the process of the present invention.
Figure 2:
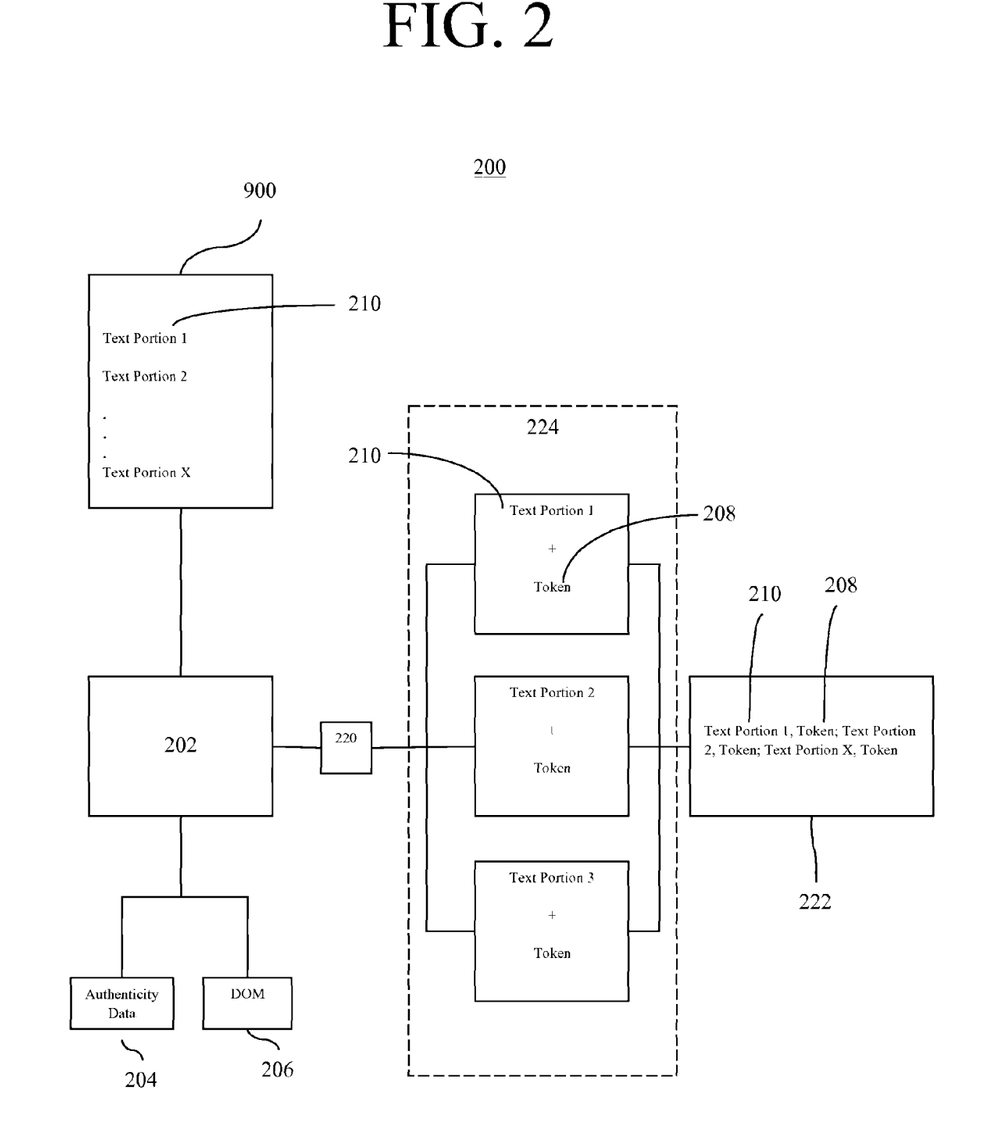
FIG. 2 is a view of an embodiment of the system of the present invention.

Referring first to FIGS. 1 and 2, a basic embodiment of the digital data security process 100 and system 200 for tracking and identifying renderable digital files is shown. The digital files most applicable to the present invention include text files constituted of markup language, e.g. docx. Even more preferred are text digital files constituted of extensible markup language ("XML"). By text files, it is meant files containing data rendered by a program into visible text. Markup language is a modern system for annotating text within a text file according to its attributes. Markup is typically omitted from the version of the text which is displayed, i.e. rendered, for end-user consumption. Some markup languages, such as HTML, have presentation semantics, meaning their specification prescribes how the structured data is to be presented, but other markup languages, such as XML, have no predefined semantics.

As the present invention manipulates markup language documents, the schema corresponding to a particular markup language is determined. The digital data security process 100 includes accessing 102 a markup language document object model ("DOM") 206 that includes markup language format schema related to a particular digital file desired to be utilized by the present invention. The markup language DOM defines a standard way for accessing and manipulating markup language documents. The markup language DOM contains methods (functions) to traverse markup language trees and access and manipulate digital file nodes. A parser that supports the DOM will take the data in a markup language formatted file and expose the file via a set of objects that a user may manipulate. The particular DOM that will be applied to the present invention may be chosen on the basis of the file that a user desires to create or investigate. By way of example, if a user is creating a .docx document with the present invention, the process 100 may access 102 the XML DOM.

Figure 3:
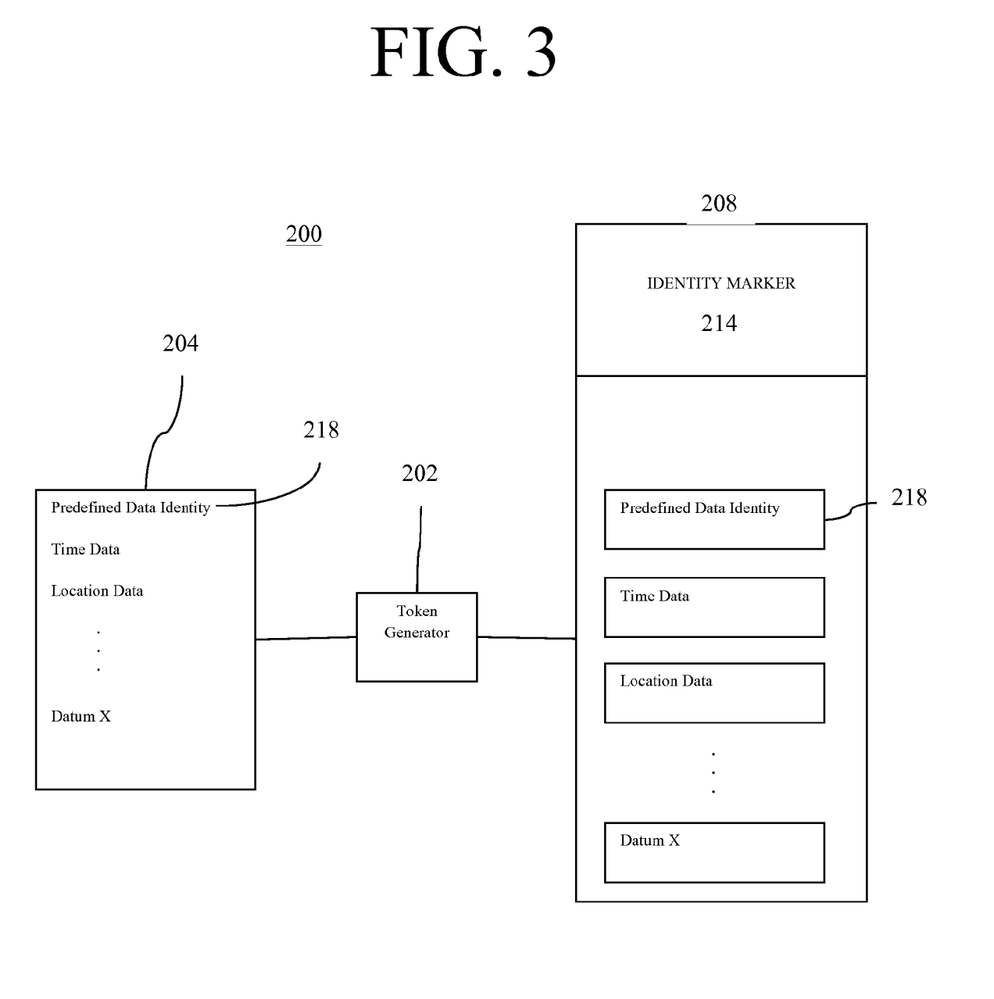
FIG. 3 is a view of an embodiment of the system of the present invention.

With reference to FIGS. 1 and 2, to identify and track a digital file 900, authenticity data 204 is integrated 104 by a token generator 202 into a cryptographic token with an identity marker. The token generator 202 includes as an input the digital file 900 with markup language. As the digital file 900 will necessarily include file identification information, the token generator may then select the appropriate DOM 206 by which to parse the information within the digital file 900. The token generator receives as further input authenticity data 204 supplied by a user of the system. Turning now to FIG. 3, the authenticity data 204 may include one or more authenticity attributes 218. Preferred authenticity data includes the system data of the computer of the user that is predefined and globally utilized by the user's computer. Further authenticity data include time stamps, location attribution elements, identity attribution elements, network attribution elements, operating and software licensing attribution elements, hardware attribution elements, user attribution elements. Potential authenticity data is highly varied and is not to be limited by the present disclosure; any data that a user desires to be associated with a document may be utilized as authenticity data.

The token generator 202 creates a cryptographic token 208 composed of the identity marker 214 and the authenticity data as the authenticity attributes 218. The encryption performed by the token generator 202 is not limited to any particular means of encryption. The present invention may be utilized with a parameterized hash, polymorphic key or a combination of the two, as well as, symmetric or asymmetric key encryption. The present invention may be utilized with any number of modular encryption routines. The present invention may also be utilized with a connection to an identity management system that may or may not rely on certificate based authentication for user identity. To ensure the integrity of the identity fingerprint, no key elements are stored within the fingerprint. The cryptographic token further includes an identity marker 214. By identity marker 214, it is meant the token portion by which the cryptographic token is identified. The identity marker is a comparative, and/or a correlative function, and is such whether the identity marker consists of encrypted data or not. The preferred identity marker 214 includes an information segment that is generic to the process or system, in other situations, it may be preferred to utilize identity markers specific to a user. The invention does not require that the document content be encrypted in order to utilize the current invention.

Returning now to FIGS. 1 and 2, the markup language tag arrangement is determined 106 by the markup language mapping function 220. The markup language mapping function 220 ascertains the structure of the digital file that the user desires to manipulate. The mapping may be as simplistic as searching for a single instance of a particular markup language tag, or may be as complex as mapping the entirety of the file structure of the digital file in parent/sibling/child nodes. It is preferred that the present invention utilize a repeating markup language tag that corresponds to renderable expression. An example of a preferred markup language tag includes the markup language tag for the paragraph structure of a document. For reasons explained in this disclosure, infra, a repeating markup language tag corresponding to renderable expression is preferred to permit the facile determination of digital files derived from marked files 222, i.e. digital files bearing cryptographic tokens supplied by the present invention.

The token generator 202 with reference to the DOM 206 preferably creates a cryptographic token that in its final form utilizes as expression only symbols permitted by the DOM. It is further preferred that the token generator 202 create a cryptographic token that in its final form utilizes as expression symbols purposefully imitative of the markup language tag of the digital file into which the cryptographic token will eventually by placed. For example, if the destination for the cryptographic token is the markup language tag corresponding to a paragraph, the token generator utilizes symbols related to the symbols for that of the paragraph markup language tag. The particular means of imitation may depend on the nature of the desired imitation and knows as its only restriction that the imitation may not permit a program to render the cryptographic token as text or prevent otherwise renderable data within a functional markup language tag to be rendered as text. The token generator 202 creates a cryptographic token expressed in a form in which, when reviewed by a reading program, does not register as functional markup language instructions pursuant to the DOM, i.e. the cryptographic token is "inert" as it relates to the DOM and programs operating with reference to the DOM.

Although the present invention is primarily described herein as relating to xml files, the invention is broadly applicable to all file forms. In particular, the present invention relates to all renderable files that include an unrendered instruction component and a renderable component. An additional example of files amenable to the present invention are .pdf files. Certain pdf files, as characterized in Adobe Systems Incorporated (2008-07-01), Document Management—Portable Document Format, Part 1: PDF 1.7, First Edition, include highly sophisticated syntax. The syntax includes four elements: objects, file structure, document structure, and content streams. The pdf file structure determines how objects are stored in a pdf file, how they are accessed, and how they are updated. This structure is independent of the semantics of the objects. The pdf document structure specifies how the basic object types are used to represent components of a pdf document: pages, fonts, annotations, and the like. A pdf content stream contains a sequence of instructions describing the appearance of a page or other graphical entity. These instructions, while also represented as objects, are conceptually distinct from the objects that represent the document structure and are described separately. The cryptographic token may be placed in any of the pdf syntax sub-element instructions, e.g., markup language tags, that characterize the elements, so such as the placement is inert.

The cryptographic token is embedded 108 by the fingerprint updater 224 within one or more of the markup language tags of the destination digital file 900 in a manner that prevents the cryptographic token from being recognized as functional markup language with reference to the DOM or disrupting legitimate functional markup language present in the destination digital file prior to the introduction of the cryptographic token, i.e. "inert" placement within the markup language tag. Together with the inert construction of the cryptographic token, the inert placement of the cryptographic token with the markup language creates a data structure that is securely embedded within the markup language digital file and not renderable or detectable during the normal operation of a resulting marked digital file 222, yet fully reviewable for authenticity data. Placement of a cryptographic token is performed via employing various element attributes of the DOM using standard xml syntax and markup. These element attributes include styles, paragraphs, and fonts. A preferred means of placement of a cryptographic token includes positioning the cryptographic token after the "/" in the markup language tag statement which usually terminates in a "</>" phrase. Alternative positioning includes any location within a markup language that causes no reaction adverse from the underlying application.

The resulting marked digital file 222 carries within its markup language tags authenticity data relating to such information as is desired by a user to be associated with the digital file. Turning now to FIGS. 2 and 4-6. The marked digital file 222 may be sought by scouring 110 one or more digital files with a scouring agent 226 for instances of the identity markers present in marked digital files 222. The means of scouring 110 are diverse and vary by the capabilities and connectivity of the user. Four preferred means of scouring include transmission scouring 228, dynamic external scouring 230, dynamic internal scouring 232, and manual scouring 234. In manual scouring 234, the user specifies one or more documents from a suspect document set 902 that it desires to be scoured. Upon scouring the system and process review the data structure of the suspect documents 904 within the suspect document set 902. The present invention may either seek the identity marker of the cryptographic token or attempt to decrypt portions of the suspect document to determine the presence of the cryptographic token. Any decryption would require a key issued to the user, which may be activated by an access code input by the user. Digital files bearing a cryptographic token of the present invention may be listed in a marked digital file database 236 or otherwise physically copied in the digital file database 236.

Figure 4:
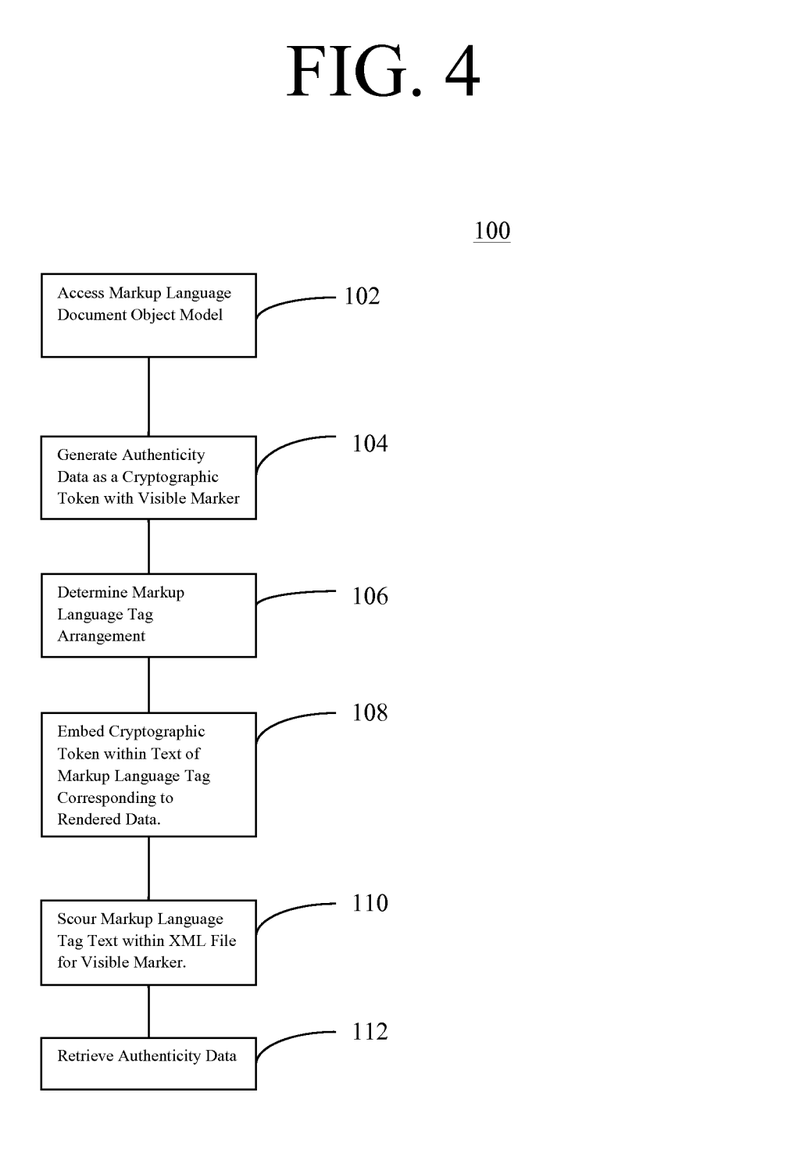
FIG. 4 is a view of an embodiment of the process of the present invention.
Figure 5:
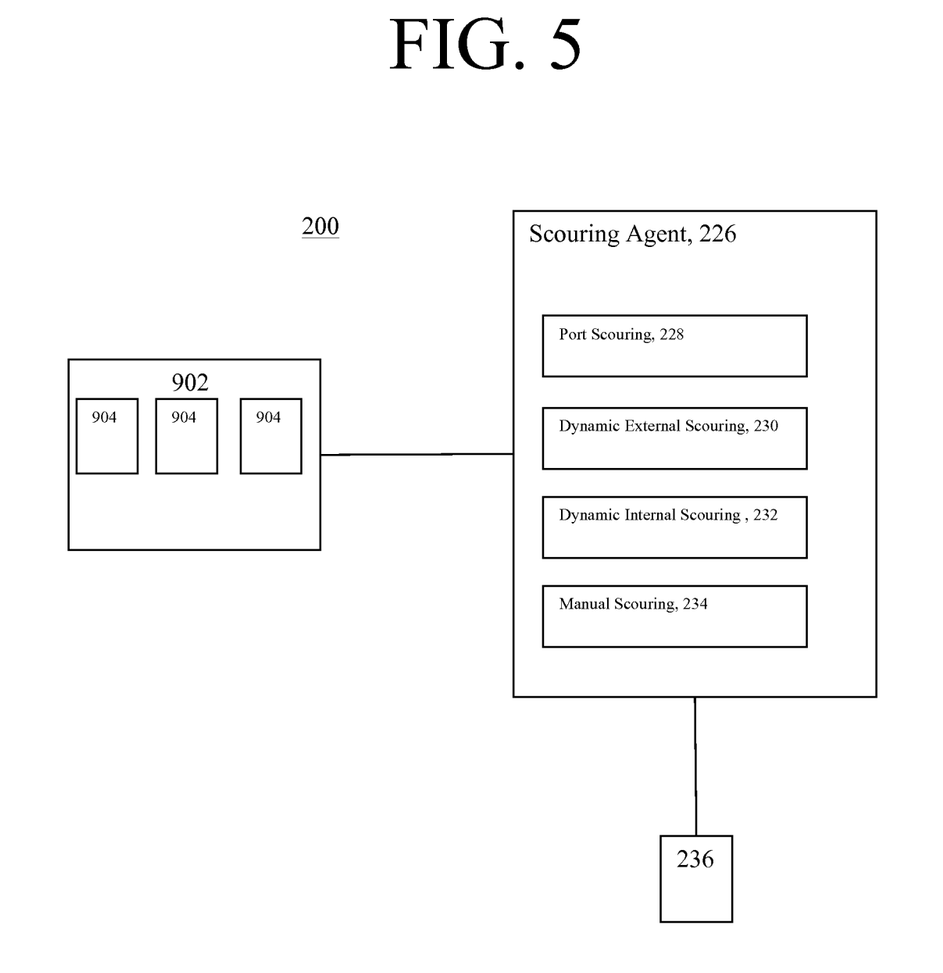
FIG. 5 is a view of an embodiment of the system of the present invention.
Figure 6:
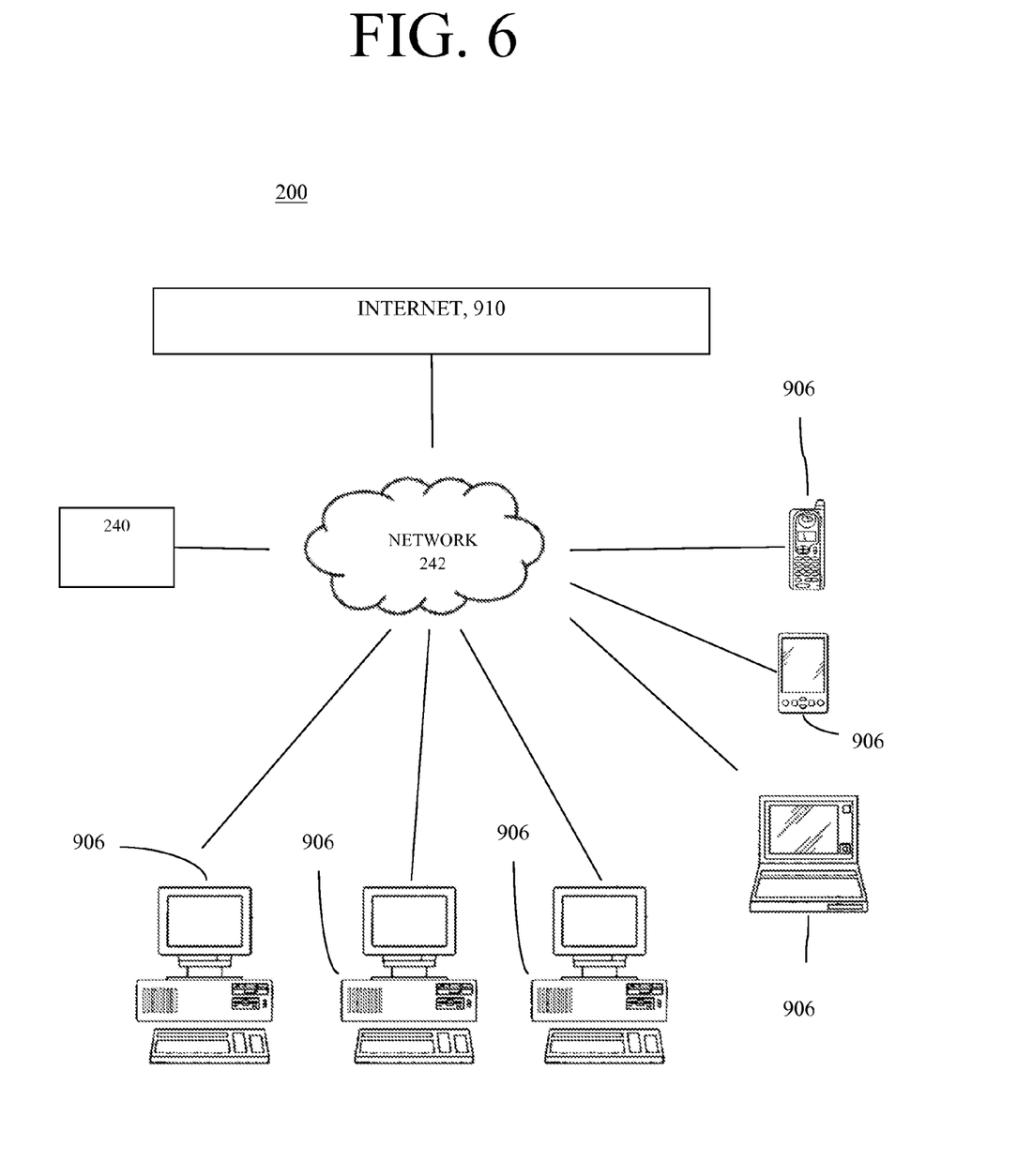
FIG. 6 is a view of an embodiment of the system of the present invention.

In dynamic external scouring 230 the present invention may utilize a crawler bot to scour digital files available over an external network, e.g. the Internet. Upon locating a marked digital file, the system or process may list the marked digital files in a marked digital file database 236 or otherwise physically copy the marked digital files in the marked digital file database 236. In dynamic internal scouring 232, the present invention may utilize a crawler bot to scour digital files available over an internal network, e.g. local area network. By crawling, is meant an automated routine by which an agent selects data sources and combs the data sources. External crawling may be accomplished by any means known in the art, including the means disclosed in U.S. Pat. Nos. 7,647,370; 7,647,351; 7,181,681; 7,072,890; 6,418,433; and 6,638,314, which are hereby incorporated by reference. Internal crawling may be accomplished by any means known in the art, included the means disclosed in U.S. Pat. Nos. 7,698,259; 7,386,544; 6,463,433; and 6,321,224, which are hereby incorporated by reference.

Upon locating a marked digital file, the system or process may list the marked digital files in a marked digital file database 236 or otherwise physically copy the marked digital files in the marked digital file database 236. The present invention need not be confined merely to seeking marked digital files; in certain instances where a network would be populated primarily by marked digital files, the present invention may scour suspect document sets 904 for digital files lacking a cryptographic token, either partially or wholly. In embodiments of the present invention configured to scour suspect document sets 904 for digital files lacking a cryptographic token, the present invention would proceed as in any other scouring embodiment, however, the suspect document sets may be identified by through fingerprint analysis as lacking a cryptographic token. The suspect document sets may include any variety of document sets and repositories thereof, including internal storage, websites, databases, networks, etc. Once identified, the digital file lacking a cryptographic token may be handled as desired by the operator of the present invention. Such actions may include, forbidding continued transmission of the unmarked file, recording the file in a database, recording attributes of the file in a database, or any other security action known to IT protection.

With reference to FIGS. 5 and 6, in transmission scouring 228 the present invention may utilize a secured gate 240 to review incoming and outgoing transmissions into/from a local area network or other discrete set of one or more electronic devices 906 capable of generating digital files. The secured gate 240 acts in conjunction with the network server 242 to review each digital file passing by the gate to devices 906 connected to the network 242. The secured gate 240 checks each file passing into the network, say for example from the Internet 910, for the presence of the cryptographic token. It is preferred that the secured gate 240 merely seeks the presence of the identity marker. Upon locating a digital file with a identity marker, or conversely a file lacking a identity marker, the present invention may indicate the existence of the digital file in the digital file database. The secured gate may further check each file passing from the network, say for example to the Internet 910, including such popular external network storage sites as DROPBOX, for the presence of the cryptographic token. It is preferred that the secured gate 240 merely seeks the presence of the identity marker. Upon locating a digital file with a identity marker, or conversely a file lacking a identity marker, the present invention may indicate the existence of the digital file in the digital file database. Furthermore, the present invention may perform a secondary operation dedicated to allowing/denying permission for the egress of the digital file.

Figure 7:
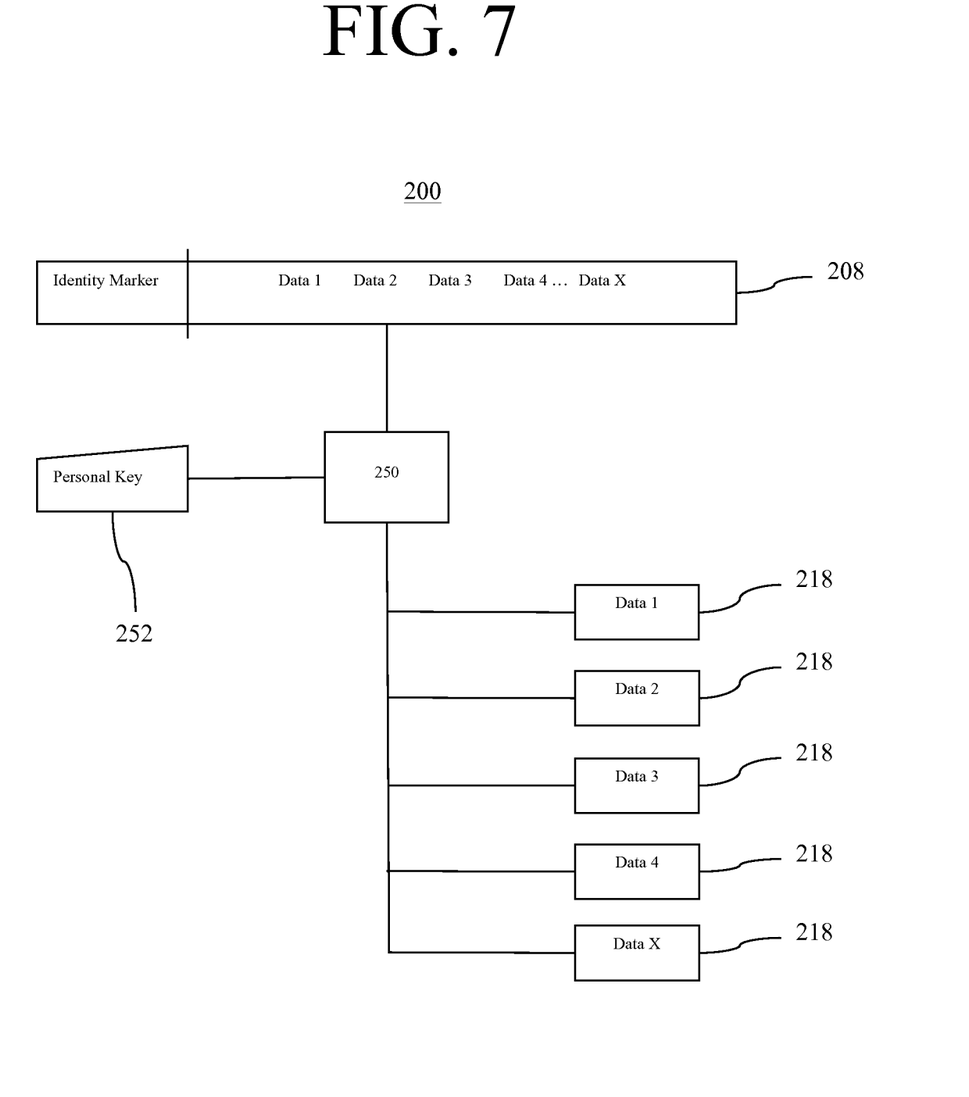
FIG. 7 is a view of an embodiment of the system of the present invention.

Turning now to FIGS. 4 and 7, the process of the present invention may further retrieve 112 the authenticity data as plain text from the cryptographic token via the data retriever 250. The data retriever 250 may access the database of marked digital files, and upon entry of a secured key code, the key 252 of the user may be used to decrypt the authenticity data within the cryptographic token into the authenticity attributes 218 as plain text.

Figure 8:
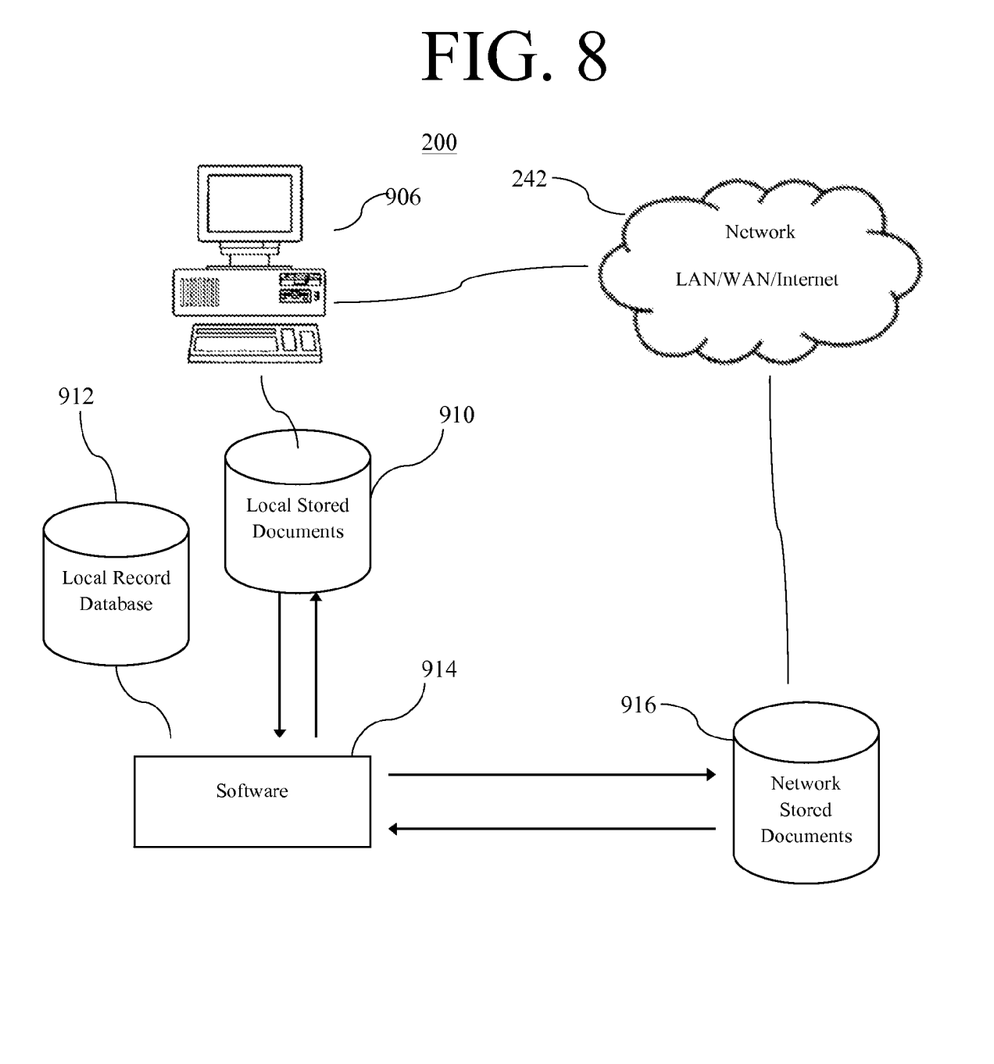
FIG. 8 is a view of an embodiment of the system of the present invention.
Figure 9:
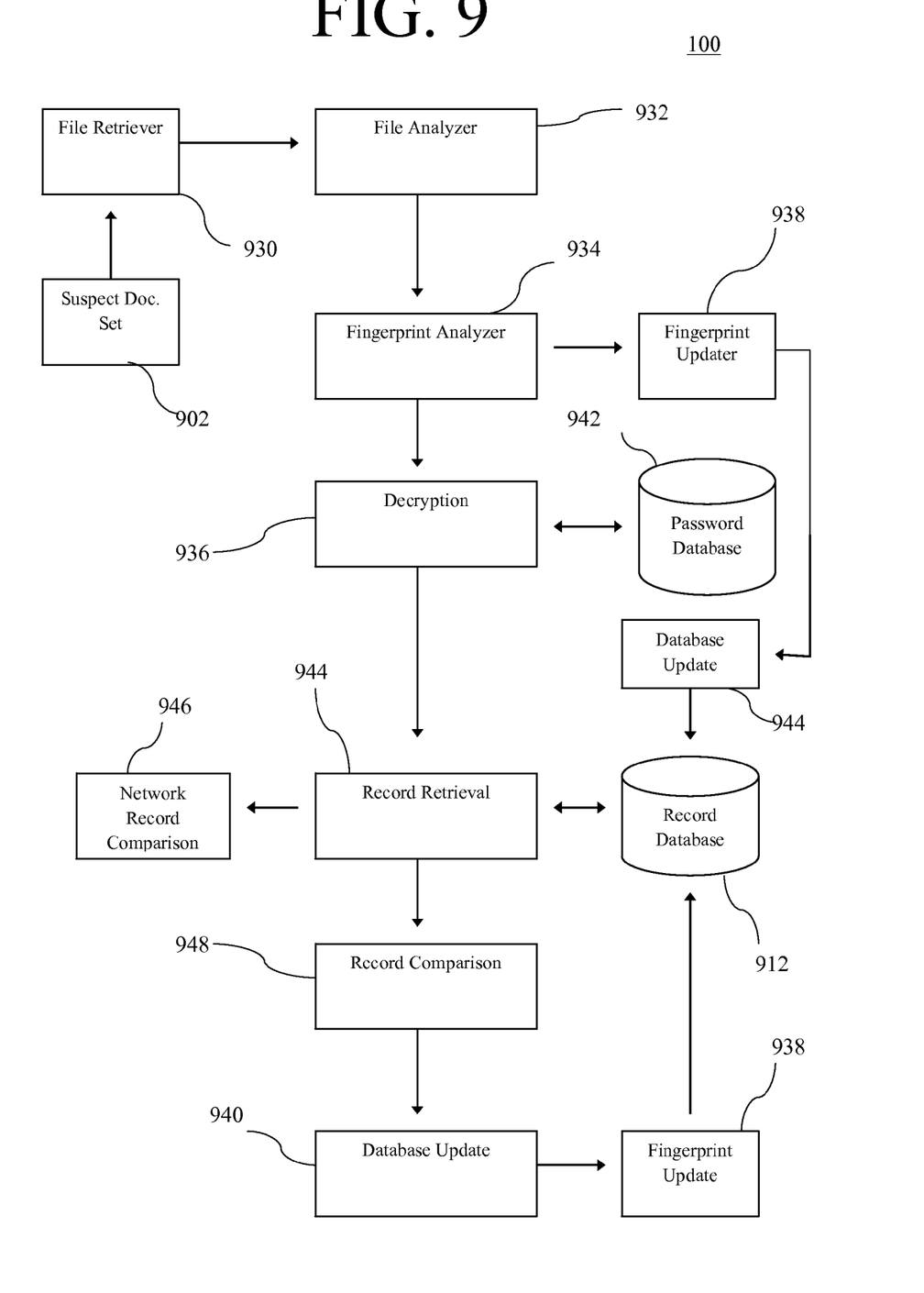
FIG. 9 is a view of an embodiment of the system and process of the present invention.
Figure 10:
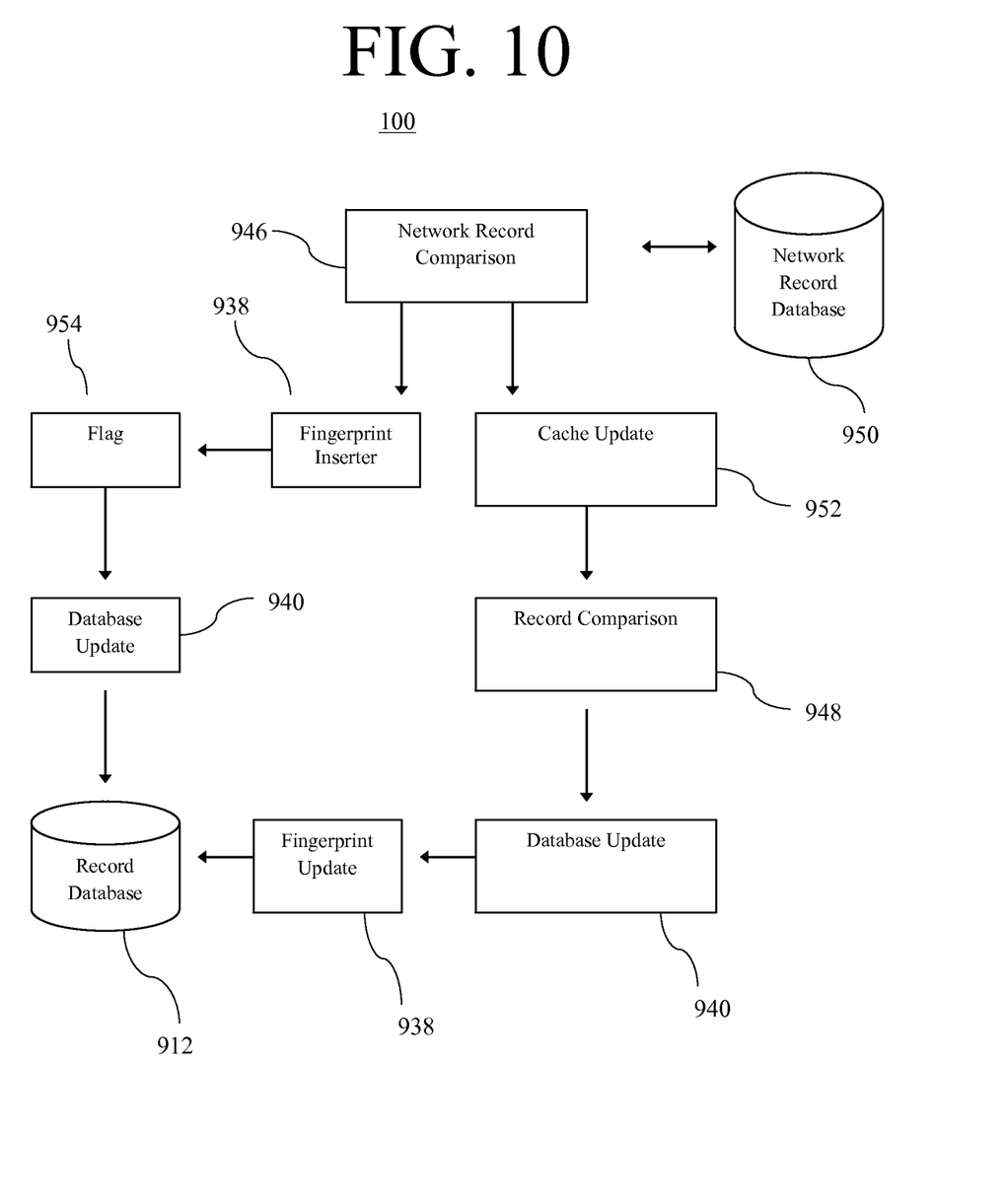
FIG. 10 is a view of an embodiment of the system and process of the present invention.

The system 200 of FIG. 8 depicts a preferred scouring mechanism pursuant to the process 100 of FIGS. 1 and 9-10. There is at least one electronic device 906 connected to a network 242. The electronic device 906 may include software 914 operating the process 100, or portions thereof, of the present invention. The software 906 communicates directly with locally stored documents 910, via a network 242 with network stored documents 916, and with a local record database 912. Locally stored documents may include the documents on the processing system where the software 914 is operating. The local record database 912 stores copies of the document identity markers of interest to the user of the system 200. Identity markers may be of interest to a user for various reasons; the identity markers may relate to the user, the identity marker may relate to specific files that relate to the user, the user may be tasked with monitoring files bearing the identity markers, etc. The local database may also store the locally stored document names and/or a full or partial copy of the identity marked documents. The local database may also be configured to store and then forward files and records to the network database.

A preferred scouring process 100 includes a file retriever 930 that acts to input files into the software from a source of suspect documents 902. By source or set of suspect documents, it is meant that there is pool from which suspect documents may be found rather than implying foreknowledge of the existence of documents bearing identity markers. The file retriever may vary in complexity and instructions. The file retriever 930 may seek files from an external source or internal source and may do so passively or dynamically. By passively it is meant that the file retriever is placed in the stream of file transmissions and the file retriever accesses only those files within that stream. By dynamically it is meant that the file retriever is provided instructions to seek files to input them into the process 100. The file retriever 930 passes retrieved files to a file analyzer 932. The file analyzer 932 examines the files for applicability as markup language files according to the present invention. By markup language files, it is meant that the file is one that includes renderable data and portable instructions for rendering the data that are themselves not subject to rendering. The portable instructions are created from text characters, which define namespaces attributing significance to other strings of text characters, whereby such significance constitutes any number of intrinsic operations. The present invention may include as a default to accept all files that are markup language files, or specified markup files. The file analyzer 932 may filter files input into the process as desired by a user. If the file analyzer identifies the file as one accepted by the process, it passes the file to a file analyzer 934; or if the file is not accepted into the process, then the process may terminate or reset.

The fingerprint analyzer 934 reviews the input files for indications of an identity marker. The fingerprint analyzer 934 may be instructed to analyze the entirety of a file or specific portions of the file. It may be advantageous to instruct the fingerprint analyzer to review only specific portions of a file when files of interest include cryptographic tokens primarily embedded in high-level syntax signifying general document objects (e.g., type and title); whereas it may be advantageous to instruct the fingerprint analyzer to review the entirety, or large portions thereof, of a file when files of interest include cryptographic tokens embedded in low-level syntax signifying specific, numerous document objects (e.g., paragraphs, fonts, etc.). If the fingerprint analyzer 934 determines the existence of an identity marker, then the file is passed to decryption function 936; otherwise the file lacking an identity marker may pass to a fingerprint insertion function 224.

The fingerprint update function 224 inserts a cryptographic token into the file lacking a cryptographic token. The cryptographic token may include the identity marker and the authenticity data as the authenticity attributes. After insertion of the cryptographic token into the file, a database updater 940 routes the file, portions of the file, indications of the identity marker, or other file attribute capable of identifying the file or its content in the future to the record database 912.

If the fingerprint analyzer 934 determines the existence of an identity marker, then the file is passed to decryption function 936. The decryption function 936 decrypts the file by communicating with the password database. The password database 942, which may be a portion of the record database 912 or a distinct entity therefrom, provides the key for decrypting the authenticity data within the token. A record retrieval function 944 then attempts to find a record of the file from the record database 912.

If a record of the file is located from the record database 912, then a record comparison function 948 compares the file received from the file retriever 930 to the attributes of the version of the file or file portions within the record database 912. The record comparison 948 may reveal many aspects of the file, including dates of changes, the substance of changes, entities that have accessed the document/file, time spent reviewing the document, or any other information that may be obtained, tracked, or recorded in connection with a file. The file is then passed to the database updater 940 which then sends the file to the fingerprint updater 224. The fingerprint updater 224, in addition to the earlier discussed activity of inserting an identity marker into a file that previously lacked an identity marker, may alter or replace a pre-existing identity marker. The file, or other indication of the file, e.g., the identity marker, is then passed to the record database 912.

If no record of the file had been found in the local record database 912 during the record retrieval 944 step of the process 100, then the process may proceed to a network record comparison 946. The process 100 of FIG. 9 is continued in FIG. 10. The network record comparison may collect network records from the network record database 950. If the file or a previous version thereof is found in the network record database, the cache, the client code database being used to store the object records for the local documents, is updated 952 and the file is sent to the record comparison 948 for passage to the fingerprint updater 224 and database updater 940. If the file or a previous version thereof is not found in the network record database, the file is passed directly to the fingerprint updater 224. The fingerprint updater 224 may alter or replace the pre-existing identity marker. The file, or other indication of the file, e.g., the identity marker, is then flagged and then passed to the record database 912. The flagging indicates that the file has not been identified or never before fingerprinted/tokenized. Flagging allows the present invention to create a token/fingerprint in the flagged file. The flagging may be a distinct step of the process or subcomponent of the system, or subsumed into another step of the process or subcomponent of the system.

Figure 11:
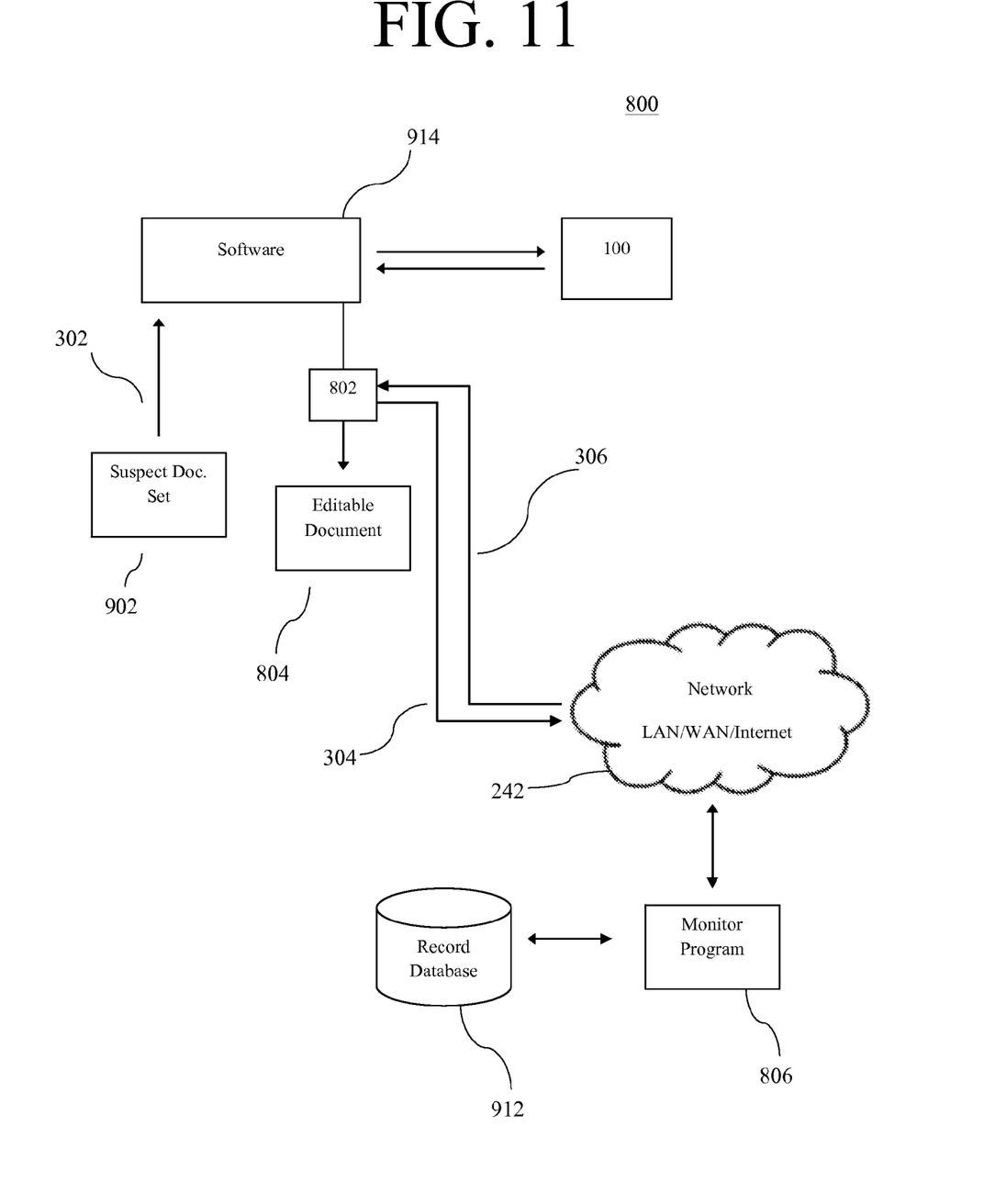
FIG. 11 is a view of an embodiment of the system and process of the present invention.

Turning now to FIG. 11, in view of FIGS. 3 and 9-11, the present invention also includes a process 800 for providing an alert based on information within a token 208 with the option of taking some further action based on the alert. The token 208 may include within its contents authenticity attributes 218 that define the identity of the draftsman of an editable document—by name, computer, or the like. A software product 914 that interacts with the present invention may access 302 from a document database, whether a local document database or network document database, an editable document 804 via a file retriever 930. The file analyzer 932 reviews the editable document 804 for applicability with the processes of the present invention. The fingerprint analyzer 934 detects the presence of a token 934, which may then be decrypted 936, to determine the authenticity attributes, including identity data. If the present invention detects the presence of identity data that conflicts with, or differs from, the identity of the user or computer system upon which the editable file has been accessed, then an alert may be sent by the alarm 802. The basis of the alert may be the existence of instructions within the software product 914, or the basis of the alert may be the existence of token component, e.g., authenticity attributes 218, bearing alert instructions as to the authorizations that permit further editing of, or actions relating to, the file. The authorizations my include edits by particular people, groups, systems, or any other entity or division desired.

It is preferred that the existence of an applicable token, for example a token bearing authenticity data having an alert instruction or alert transmission instruction, triggers the alarm to notify a monitor program 806. The monitor program 806 accesses the record database to ascertain data related to the token related to the digital file processed by the software product 914. Two preferred versions of the present invention utilize durable token alert restriction instructions and token alert transmission instructions. In the former version, the token includes instructions that travel with the token for file action restrictions and the token need not correspond with an outside source to instruct the software product directly to restrict file actions. In the latter version, the token includes instructions to correspond with the monitor program for further guidance on file action restriction by which the monitor program instructs the software product directly to restrict file actions. The present invention may further utilize a combination of the two versions, and the significance of the record database may vary from the generally passive role of record keeping related to the uses of the marked digital file to the more active role of providing the action authorizations. The alarm 802 transmits 306 the existence of the token to the monitor program 806. The monitor program 806 may not act, simply store the instance of file action in as great of detail as may be desired in the record database, or transmit 306 return authorizations for actions.

The alarm 802 may provide multiple actions. By edits/actions it is meant that the file may be locked, or the process otherwise sends a notification, for instructions related to review, modification, distribution, adaptation, display, access, or other action. The alarm 802 may perform actions on the local computer system upon which the software product 914 providing the edits is being accessed. It is further preferred that the alarm 802 send an alert of the access to the editable document over the network 242. Further instructions may arrive from over the network and the access, which was the subject of the alert, may be logged in a database, network or local. A preferred instruction prevents further actions by a realtime user of an editable document 804 of the present invention that differs from the documents creator. Although the instructions have been discussed in reference to identity authenticity data, instructions may be provided on the basis of any conflict, contrast, or like test with any variety of authenticity data of the token.

Although editable documents may be closed for further editing by the program that has created the particular editable document file, the present invention may be utilized as a global edit-lock solution. That is to say, the present invention may, so long as it interacts with software that edits a document, may provide edit locks for that software that replace or supplement that software's native edit lock functions. When applied to multiple software products that edit documents, the present invention further provides a uniform solution to edit locks and alerts throughout a system.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A digital data security scouring process for monitoring digital file transmissions, said process comprising:
   positioning a file retriever in a transmission pathway between an electronic device and a file repository;
   monitoring said transmission pathway for a secured digital marked file, said secured digital marked file comprising:
      markup language tags constructed according to a markup language document object model ("DOM"); and
      a textual cryptographic token, inertly embedded within at least one markup language tag of said digital file, with encrypted authenticity data and a visible identity marker.

2. The process of claim 1 wherein said positioning step includes positioning said file retriever with access to a network.

3. The process of claim 1 wherein said positioning step includes positioning said file retriever within a memory of said electronic device.

4. The process of claim 1 further comprising the step of accessing a record database of at least one target visible identity marker.

5. The process of claim 4 further comprising the step of comparing at least one of said target visible identity markers of said record database to said visible identity marker of said secured digital marked files.

6. The process of claim 5 further comprising the step of decrypting said authenticity data.

7. The process of claim 6 further comprising the step of retrieving from said record database a record of an ancestor marked digital file of said secured marked digital file, wherein said secured marked digital file includes authenticity data related to authenticity data of said ancestor marked digital file.

8. The process of claim 7 further comprising the step of comparing attributes of said ancestor marked digital file with attributes of said secured marked digital file.

9. The process of claim 8 further comprising the step of updating said cryptographic token of said secured marked digital file with updated authenticity data.

10. The process of claim 9 further comprising the step of updating said record database to include attributes of said secured marked digital file.

11. The process of claim 10 wherein said step of updating said record database includes updating said record database to includes attributes that consist of said visible identity marker and said authenticity data.

12. A digital data security scouring system for monitoring digital file transmissions, said process comprising:
   an electronic device;
   a file repository;
   a file retriever, in a transmission pathway between said electronic device and said file repository, adapted to monitor said transmission pathway for a secured digital marked file, said secured digital marked file comprising:
      markup language tags constructed according to a markup language document object model ("DOM"); and
      a textual cryptographic token, inertly embedded within at least one markup language tag of said digital file, with encrypted authenticity data and a visible identity marker.

13. The system of claim 12 wherein said file retriever accesses a network.

14. The system of claim 12 wherein said file retriever is within a memory of said electronic device.

15. The system of claim 12 further comprising a record database of at least one target visible identity marker.

16. The system of claim 15 further comprising a fingerprint analyzer adapted to compare at least one of said target visible identity markers of said record database to said visible identity marker of said secured digital marked files.

17. The system of claim 16 further comprising a decrypt engine adapted to decrypt said authenticity data.

18. The system of claim 17 further comprising a record retrieval engine adapted to retrieve from said record database a record of an ancestor marked digital file of said secured marked digital file, wherein said secured marked digital file includes authenticity data related to authenticity data of said ancestor marked digital file.

19. The system of claim 18 further comprising a record comparer adapted to compare attributes of said ancestor marked digital file with attributes of said secured marked digital file.

20. The system of claim 19 further comprising a fingerprint updater adapted to update said cryptographic token of said secured marked digital file with updated authenticity data.

21. The system of claim 20 further comprising a database updater adapted to update said record database to include attributes of said secured marked digital file.

22. The system of claim 21 wherein said attributes consist of said visible identity marker and said authenticity data.

23. A digital data security scouring system for monitoring digital file transmissions, said process comprising:
   an electronic device;
   a file repository;
   a file retriever, in a transmission pathway between said electronic device and said file repository, adapted to monitor said transmission pathway for a secured digital marked file, said secured digital marked file comprising:
      markup language tags constructed according to a markup language document object model ("DOM"); and
      a textual cryptographic token, inertly embedded within at least one markup language tag of said digital file, with encrypted authenticity data and a visible identity marker, and wherein said cryptographic token includes a structure inherently inert to said DOM; and
   a fingerprint analyzer adapted to compare at least one of said target visible identity markers of said record database to said visible identity marker of said secured digital marked files.

* * * * *